Oct. 19, 1971  T. E. GREIN  3,613,287
GLASS FERRULE WITH EXTERNAL SLEEVE
Filed April 7, 1969
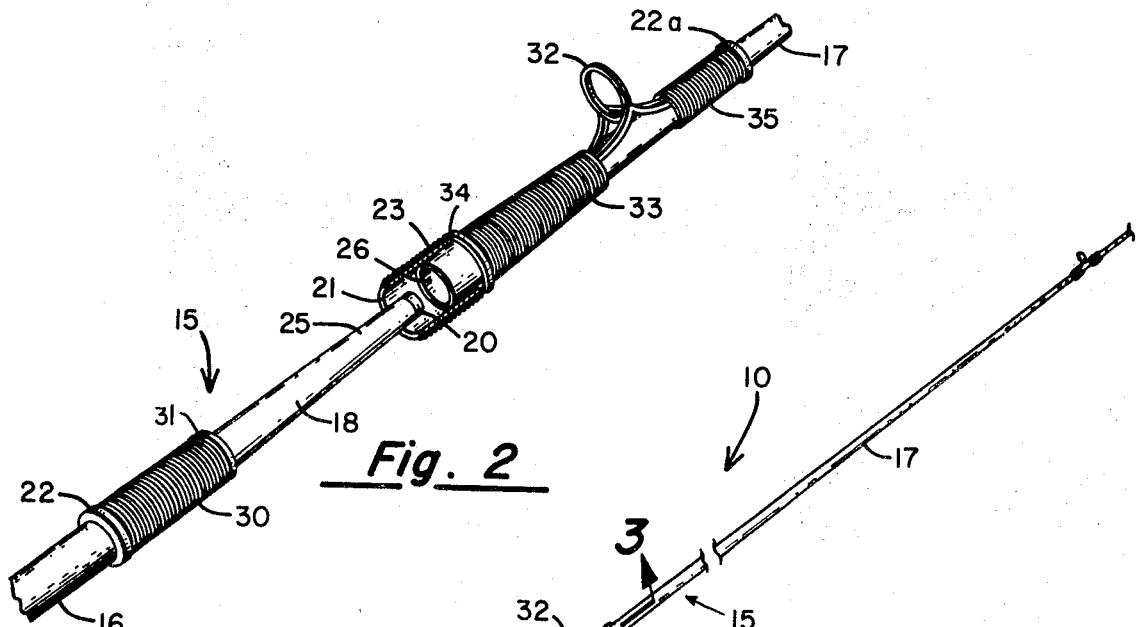
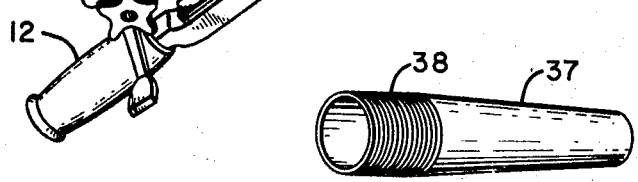
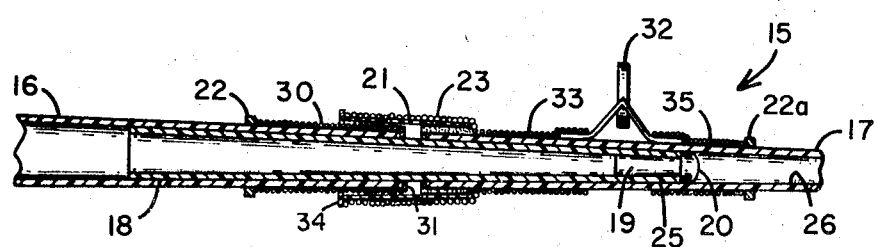
INVENTOR
THOMAS E. GREIN
BY
ATTORNEY

United States Patent Office

3,613,287
Patented Oct. 19, 1971

3,613,287
GLASS FERRULE WITH EXTERNAL SLEEVE
Thomas E. Grein, Spirit Lake, Iowa, assignor to Berkley
& Company, Inc., Spirit Lake, Iowa
Filed Apr. 7, 1969, Ser. No. 813,868
Int. Cl. A01k 87/02
U.S. Cl. 43—18 GF
4 Claims

ABSTRACT OF THE DISCLOSURE

A fishing rod including a thin-walled shaft formed of a plurality of individual tapering rod segments, the forward end of certain segments being adapted to be mated to the trailing end of the next adjacent forward segment, the segments adapted to be retained together to form a single unitary structure. Ferrule means releasably retain the mated segments together and comprises a male coupling prong secured to the forward end of one of the mating segments and received within the hollow inner core of the trailing end of the next forwardly adjacent segment. A hood sleeve means, secured to the outer periphery of one of the segments, encloses the junction established between the mating segments, and has an inner diameter exceeding the outer diameter of the next adjacent segment so as to form a narrow gap therebetween.

---

The present invention relates generally to an improved flexible shaft, and more particularly to an improved flexible shaft adapted for use as a fishing rod, the shaft being formed by coupling together a plurality of segments by means of ferrules which have flexural characteristics generally matching those flexural characteristics of the shaft segments. Fishing rods made in accordance with the present invention have the characteristic of a uniformly bending shaft element, which, when assembled, acts as a unitary continuous structure. Hood sleeve means are provided to envelop or enclose the juncture area between the two segments in such a way so as to protect the juncture area of the shaft and the ferrules when more than modest flexure occurs in the shaft.

In the design of flexible shafts for various applications, particularly for use as fishing rods, it is frequently desirable to provide a shaft which is both durable and capable of acting as a "unit" free of any strong nodal points along the shaft during the normal vibration thereof. When a rod is designed in this manner, the action of the rod is generally more predictable, the casting of a bait is accomplished with less effort, and the result is generally far more accurate. Thus, the fisherman may find his casting technique far more predictable than would be the case when using rods having discontinuities or nodal points introduced along the axial length of the shaft. In this connection, spurious modes of vibration may be established when these various nodal points are disposed along the length of the shaft, and this is responsible for lack of uniformity, consistency, and predictability in the effort of the user. In other words, it is generally desirable to utilize a rod shaft structure which will experience a minimum of localized structural abnormalities, and which will also respond in a predictable and desirable manner for the user. Uniformity in rod structure has been found to increase the output response which the rod provides to a given input of energy. Also, it has been learned that when a given rod is subjected to the playing action of a fish, the rod which functions in a predictable and uniform manner will enable the user to more easily and readily maintain a constant tension on the line without permitting slack to develop which will in turn permit the fish to disengage. The present invention provides these advantages and in addition, protects the rod from damage due to application of heavy loads thereon.

The provision of a rod having uniform or predetermined tapering characteristics, both dimensionally and mechanically, can be readily achieved by utilizing a single shaft, preferably a hollow core shaft. Fishermen normally prefer to have a rod which can be disassembled when not in use, so as to facilitate more convenient handling and storage. In order to couple the segments of the rod together to form a completed rod shaft, it is ordinarily necessary to build ferrule couplings into the structure so as to accomplish the assembly and disassembly operations. In order to preserve the characteristics of the rod, it is preferable that the ferrule connection possess physical characteristics similar to that of the rod structure, such as is shown in co-pending application Ser. No. 544,470, filed Apr. 22, 1966, Pat. No. 3,436,857, dated Apr. 8, 1969, and assigned to the same assignee as the present invention. Whenever a rod shaft is broken in this fashion, an area of strain concentration will develop at the ferrule connection zone. It is possible that localized fatigue will result from such discontinuities due to the presence of local areas of stress concentration in the shaft, particularly during application of moderate forces during use.

In accordance with the present invention, a flexible shaft particularly adapted for use as a fishing rod is provided, this shaft being formed by coupling together a plurality of individual segments of a hollow core shaft by the use of ferrules having flexural characteristics substantially matching the flexural characteristics of the shaft segments. These ferrule elements are secured to the inner peripheral wall of the hollow core shaft at the narrow tip end of each of the segments, the ferrule extending as a male prong member beyond the tip end of the rod segment. This ferrule is arranged to releasably retain the mating or adjoining segments together, and thus the outer periphery of the male prong member is adapted to be releasably received along and adjacent the inner periphery of the trailing end of the next succeeding segment being joined. In order to achieve manufacturing tolerances, and in order to permit the taking up of slack which may develop during extensive use of ferrules of this type, it is generally preferred that a gap be provided between adjacent rod segments so as to accommodate both tolerances and normal wear during use. With this in mind, care is taken so that the outer periphery of the male prong member substantially matches the inner periphery of the trailing end portion of the next adjacent segment and provides an interference fit therewith at final insertion depth, this generally requiring that the prong member be frusto-conical in configuration. The prong preferably comprises a hollow or solid resilient body of the type disclosed and claimed in the previously mentioned co-pending application of Paul C. Johnson and Harlan B. Christenson, or in the co-pending application of Thomas E. Grein and Paul C. Johnson entitled "Solid Ferrule Construction," Ser. No. 797,527, dated Feb. 7, 1969, and assigned to the same assignee as the present invention. It has been found that this arrangement provides a finished fiber glass rod shaft of substantially uniform flexural characteristics from the butt end to the tip end thereof, and the ferrule means as herein described, provide a rigid, durable coupling means for the rod segments being joined.

In the structure, the hood sleeve means is preferably secured rigidly to one end of one of the segments being joined. Preferably, the hood sleeve is coupled to the outer circumference of the segment of smaller diameter. The hood sleeve extends over the abutment area and shields the ferrule coupling area from dirt, debris and the like, but more importantly assists in transfer or equalization of strain during application of substantial forces of flexure to the rod. As indicated, manufacturing tolerances and slack require that the two segments be joined with a modest gap zone existing therebetween. During periods of application of heavy forces to the rod, particularly at the tip end, a concentration of strain may occur or exist in the area immediately adjacent the gap. The hood sleeve means assists in transferring this force between the individual rod segments, and this is accomplished without interfering with the normal action of the rod. In other words, with a modest gap existing between the inner surface of the hood sleeve, and the outer surface of the rod shaft, the transfer of strain with the hood sleeve means does not commence until substantial flexure has occurred. Thus, for normal casting use or the like, the hood sleeve means does not interfere with nor does it affect actions of the rod shaft, but is capable of performing this function whenever substantial flexure occurs.

Therefore, it is an object of the present invention to provide an improved technique to provide and apparatus for providing an internally-disposed ferrule means with external hood sleeve for coupling two segments of a hollow core rod together, the ferrule providing a substantial match of the flexural characteristics of the rod shaft so as to provide a complete unit capable of acting as a single unitary structure, the hood sleeve providing a means to preserve the ferrule during periods of rough use.

It is yet a further object of the present invention to provide an improved means for coupling two segments of a hollow tapered flexible shaft together, the coupling means including a ferrule arranged to be secured to the inner periphery of one rod segment, and adapted to be received along the interior surface of the next succeeding rod segment of generally smaller diameter, the arrangement including a hood sleeve for increasing the durability and enhancing the appearance of a ferrule coupling, the rod preferably having substantially uniform flexural characteristics from the butt end to the tip end thereof.

It is yet a further object of the present invention to provide an improved ferrule means with hood sleeve means for coupling together two segments of a tapered hollow core shaft, the ferrule including a resilient retaining means secured to the free end of one segment and having an outer dimension which provides a substantial interference fit with the inner periphery of the wall of the adjacent mating segment when at the final insertion depth, the hood enveloping the juncture zone between the segments.

Other and further objects of the present invention will become apparent to those skilled in the art upon a study of the following specification, appended claims, and accompanying drawing wherein:

FIG. 1 is a perspective view of a flexible shaft in the form of a fishing rod employing the coupling ferrule of the present invention, the shaft being shown with a portion of the body removed therefrom;

FIG. 2 is a detailed view on a slightly enlarged scale, showing the structure of the coupling ferrule and hood sleeve used in the shaft of the fishing rod of FIG. 1;

FIG. 3 is a sectional view taken along a plane through the axis of the shaft along the line and in the direction of the arrows 3—3 of FIG. 1; and FIGS. 4a, b, and c are perspective views of various hood sleeve means structures prepared in accordance with the present invention.

In accordance with the preferred modification of the present invention, and with particular reference to FIGS. 1–3 of the drawings, the flexible shaft in the form of the rod member generally designated 10 is provided at the butt end with means for retaining the reel member 11 thereon adjacent the handle portion 12. Along the length of the rod 10, a ferrule member is available at 15 for joining the two rod segments together, this including a lower segment 16 and an upper segment 17. The ferrule 15 is shown in detail in FIG. 2, this ferrule including a male prong member 18 which is coupled to the internal wall periphery of the lower segment 16, such as is shown in detail in the sectional view of FIG. 3. The prong member 18 is provided with a resilient retaining means such as the rubber member inserted in the free tip end thereof, as shown at 19, this retaining means including an integral head member or portion 20. This head member 20 has an outer diameter which generally exceeds the outer diameter of the ferrule portion 18, and is provided to make a substantial interference fit with the interior peripheral wall of the upper segment 17 of the rod member 10. In this connection, the contour of the ferrule member 18 is provided so as to substantially match the interior contour of the segments 16 and 17 at their point of juncture, the free end or tip portion of the prong 18 being adapted to be received within the confines of the segment 17, and with tolerances for manufacturing and use, provides a gap zone or standoff as shown in FIG. 3.

With particular reference to FIGS. 2 and 3, it will be seen that the prong member 18 has an outer peripheral surface as at 25. This outer surface 25 is generally frustoconical in form, and is adapted to substantially match the inner contour 26 of the upper segment 17. At its ultimate insertion depth, the outer diameter of the prong member 18 preferably exceeds slightly the inner diameter of the rod segment 17, the contours being substantially similar, one compared to another. This feature is shown in substantial detail in FIG. 3, along with the tolerance gap. It will be observed that the individual ends of the segments 16 and 17 are covered with the hood sleeve 21 which envelops the juncture when the segments are in final assembled form, as shown in detail in FIG. 3.

The hood sleeve means is, as indicated, utilized to envelop the gap zone existing between the individual segments when coupled together. The hood sleeve means is shown at 21, and is preferably fabricated with an inner diameter which slightly exceeds the outer diameter of the adjacent rod segment. As shown in FIG. 3, the hood sleeve means 21 is secured to the segment 17 and envelops or covers the terminal end portion of the rod segment 16. There is preferably a slight gap existing between the outer periphery of the rod segment 16 and the inner periphery of the hood sleeve so as to permit a modest amount of flexural motion to occur between the individual segments about the area of the coupling prong 18, without interference or reinforcing effort from the hood sleeve means 21. However, when the flexure becomes substantial, the hood sleeve means contacts the surface of the adjacent rod segment, and assists in transferring or equalizing strain.

The materials of construction for the shaft are preferably a plastic-impregnated glass cloth. As is conventional in this art, the cloth is rolled upon a mandrel to the desired configuration, and thereafter cured in the conventional way. The glass cloth preferably has the majority of the filaments running in the axial direction of the shaft in order to provide for superior rod action. Glass cloth impregnated with various resins, such as phenolics or epoxies, with particular application to fishing rod structures are available commercially. The materials of the prong member are set forth hereinbelow, it being important to match, if possible, the flexural characteristics of the prong member with the flexural characteristics of the shaft segments 16 and 17.

The materials of construction for the good sleeve means are preferably of a material with an elastic modulus less than the material of the rod. Thus, damage to the rod surface is avoided. It has been found that a thermoplastic material is generally preferred because of the ease of preparing cylindrical members or sleeves with thin walls. The materials are also preferably cementable, tough in thin-wall environments, free from color, but colorable, and dimensionally stable. The material is also preferably tough without a plasticizer so as to avoid changes in characteristics and performance with age.

Among the materials of construction for the hood sleeve means are the following: nylon, vinyl, ABS, cellulose acetate butyrate, cellulose acetate propionate, cellulose acetate, high impact styrene, urethanes, and soft ductile metals. The preferred material is nylon, this being cementable, tough in thin-wall environments, free from color but colorable, and possesses dimensional stability. The elastic modulus of nylon is less than that of a plastic impregnated glass cloth, particularly when impregnated with various resins such as phenolics or epoxies.

Along the outer periphery of the individual segments 16 and 17 are the winding checks 22 and 22a which confine the windings 23 which extend about the circumference and peripheray of the hood sleeve 21. As indicated, these windings also engage the outer circumference of the rod segments per se. For example, the rod segment 16 is provided with a thread winding 30 adjacent the tip end thereof, this being terminated in a winding check 31 at the free end thereof. The trailing end of the segment 17 has a winding area 33 together with an accompanying winding check 34 along the end thereof. The line guide 32 is held by means of the windings 33 at the trailing end thereof and by the cooperating windings 35 at the forward end thereof. While the various windings may be available and utilized at any portion along the rod, as indicated by the use to which the rod is to be put, it is generally desirable to locate a winding such as shown in FIGS. 2 and 3 along and adjacent the ferrule area. This enhances and assists the general, over-all aesthetic appearance of the system, and provides a smooth surface transition.

It has been found that the tube-in-tube ferrule along with the hood sleeve means as shown in the present invention provides a rugged over-all assembled product.

As indicated previously, the winding of a line guide is preferably disposed along and adjacent the ferrule area. In addition to the aesthetic considerations, it has been found that there is less contribution of instability to the entire system whenever a ferrule is disposed in the area of a line guide winding. The over-all strength and durability of the rod is substantially the same as a rod having a solid tube configuration, without knock-down ferrule features included.

Attention is now directed to FIGS. 4a, b and c of the drawings wherein various configurations of hood sleeves are shown. In this connection, FIG. 4a illustrates a thin wall sleeve of thermoplastic material, preferably nylon, which is substantially cylindrical in shape and which is adapted to enclose, confine, and otherwise envelop the outer surface of the individual rod segments.

The structure illustrated in FIG. 4b shows a generally cylindrical member 37 which is molded to a taper for providing smooth flowing lines to the device, and also to provide a graded transition of strain. This device may also be provided, if desired, with an area for showing or receiving threads, as at 38.

Turning now to FIG. 4c of the drawings, the generally cylindrical or frusto-conical structure 39 is provided with a molded-in taper along with a thread receiving or thread imitation area as at 40, the threaded area being separated from the frusto-conical area 39 by the step-down zone 41. As indicated previously, the tapered structure assists in a transition of force between the individual rod segments.

A particularly valuable feature of this invention lies in the production of the rods, and the minimum number of operations added by virtue of inclusion of the features of the present invention. In this connection, a single rod shaft or blank is formed having the length desired for the finished product, and this rod shaft is then cut transversely to the axis thereof to form the mating segments. These segments are then fitted with the ferrule and hood sleve means in order to permit the rod to be assembled as a single durable unitary member with substantially uniform mechanical and flexural characteristics.

What is claimed is:

1. A fishing rod comprising a thin-walled shaft being formed of a plurality of individual segments, the forward end of certain segments being adapted to be mated to the trailing end of the next adjacent forward segment, the segments being adapted to be retained together to form a single unitary structure of generally hollow core construction and having a gripping handle at the butt end thereof, the unitary structure tapering continuously from the butt end to the tip end of the composite structure with the forward and trailing ends of each pair of mating segments being joined together with the inner diameter, outer diameter, and wall thickness of the mated segments being arranged in substantial continuation along the shaft and adjacent the juncture points of the mating segments, said rod further comprising:
(a) ferrule means arranged to releasably retain said mating segments together with the cross-sectional surfaces of the walls of adjacent sections being retained in spaced-apart relationship, one to another, said ferrule means comprising a generally rigid male coupling prong secured to the inner periphery of the forward end of one of said mating segments and adapted to be received within the hollow inner core of the trailing end of the next forwardly adjacent segment, said prong extending outwardly from said forward end and being generally tapered from said forward end along the axial extent thereof to a contour substantially similar to the inner contour of the hollow inner core of the next forwardly adjacent segment along the juncture region; and
(b) hood sleeve means secured in normal disposition coaxially about the outer periphery of a first of said segments and arranged to enclose the juncture established between said mating segments along with a portion of the axial length of a second of said segments, said hood sleeve means having an inner diameter which exceeds the outer diameter of said segments at and immediately adjacent said juncture so as to form an annular circumferential gap therewith while in said normal disposition, said gap existing between the outer periphery of said second rod segment and that portion of the hood sleeve means which extends beyond the end of said first rod segment, and being of a magnitude to establish initial contact with the inner periphery of said hood sleeve and the outer periphery of said second segment only upon first achieving moderate lateral flexing of said shaft.

2. The fishing rod as defined in claim 1 being particularly characterized in that said rod comprises fiber glass impregnated with a plastic resin having a certain first modulus of elasticity, and said hood sleeve means has a modulus of elasticity which does not exceed that of the rod.

3. The fishing rod as defined in claim 2 being particularly characterized in that said rod segments are formed of phenolic impregnated fiber glass, and said hood sleeve means is fabricated from nylon.

4. The fishing rod as defined in claim 1 being particularly characterized in that said hood sleeve means is fabricated from molded thermoplastic.

References Cited

UNITED STATES PATENTS

| | | | |
|---|---|---|---|
| 189,120 | 4/1877 | McClintock. | |
| 264,243 | 9/1882 | Chubb | 43—18 X |
| 3,048,432 | 8/1962 | Harter | 43—18 X |
| 3,310,903 | 3/1967 | Binvignat | 43—18 |

SAMUEL KOREN, Primary Examiner

D. J. LEACH, Assistant Examiner

U.S. Cl. X.R.

287—104, 119 R